United States Patent Office 3,832,311
Patented Aug. 27, 1974

3,832,311
FLAME-RESISTANT POLYURETHANE FOAMS
Erwin Windemuth, Leverkusen, Manfred Dahm, Bergisch-Neukirchen, Karl Hartwig Richert, Leverkusen, and Dieter Maassen, Dormagen, Germany, assignors to Bayer Aktiengesellschaft, Leverkusen, Germany
No Drawing. Continuation of abandoned application Ser. No. 106,283, Jan. 13, 1971. This application June 6, 1972, Ser. No. 260,342
Int. Cl. C08g 22/44
U.S. Cl. 260—2.5 AT                5 Claims

ABSTRACT OF THE DISCLOSURE

Flame-resistant polyurethane foams are disclosed which are prepared by reacting a polyether polyol having a molecular weight of from about 750 to about 10,000 in which at least 10% of the hydroxyl groups are primary hydroxyl groups, with a polyisocyanate which is a solution of from about 10 to about 70% by weight of an organic polyisocyanate containing at least one N,N'-disubstituted allophanic acid ester group dissolved in a liquid polyisocyanate which is free from allophanic acid ester groups.

---

This is a continuation of application Ser. No. 106,283, filed Jan. 13, 1971, now abandoned.

The production of polyurethane foams by reacting polyisocyanates, e.g. tolylene diisocyanates which are readily available on a large technical scale, with polyols in the presence of additives is already known. Such foams are widely used, e.g. for the production of cushioning materials, for heat insulation, sound insulation, textile coating, packaging, and the production of structural material. Unfortunately, a disadvantageous characteristic of such foams which precludes their use in certain fields is that they are readily inflammable.

The production of polyurethane foams which contain flame-retarding substances such as compounds of phosphorus, halogens, artimony, bismuth, boron and to some extent nitrogen are also known. The flame-retarding additives may be subdivided into those which are actually incorporated into the foam structure via reaction of functional groups and those which, due to the absence of such groups, are only physically present in the manner of plasticizers or fillers (see Chapters 2, 3, 10 flammhemmende Substanzen, Kunststoff - Handbuch, Vieweg/Hoechtlen, Volume VI, Polyurethane, Carl-Hanser—Verlag, Munich, 1966).

Each type of flame-retarding substance prossesses serious disadvantages when used in polyurethane foams of low density and large surface area. For example, those additives which cannot be incorporated into the polyurethane polyurea structure are only present as plasticizing diluents in the high molecular weight product which is in the process of being formed. Frequently, due to this factor, such additives cause deterioration of desirable physical properties such as high tear resistance, elasticity and load bearing capacity, as well as an increase in permanent deformation after mechanical or thermal stress. Furthermore, because of their vapor pressures, such flame-retarding substances diffuse out of foams of low density and large surface area with the passage of time. As a result, the flame protective effect of such materials diminishes as time passes. Further, since such compounds exert their flame protective effect as non-combustible materials by reducing the proportion of combustible component in the foam material or by diluting the combustible decomposition products which are formed on exposure to thermal stress, they must always be used in relatively high concentrations. Thus, for example, the flame protective agent tris-b-chloroethyl phosphate must be used in amounts of from about 15 to about 20 parts by weight per 100 parts by weight of polyol component if it is to provide sufficient flame protection in the polyurethane foam.

When using flame-retarding additives which have groups which can be incorporated into the polyurethane via reaction of functional groups, disturbances often occur during the foaming process which manifest themselves in a change in the internal cell structure or in a partial or complete collapse of the foam which has not yet set. The mechanical properties of the finished foam, such as elasticity, load bearing capacity and permanent deformation, are usually adversely affected and the aging properties are seriously impaired.

It is therefore an object of this invention to provide polyurethane foam resins and a process for their preparation which are devoid of the foregoing disadvantages.

Another object of this invention is to provide polyurethane foams which are highly resistant to elevated temperatures and contact with a flame.

A further object of this invention is to provide flameproof urethane containing foam resins which are inherently flameproof and which possess improved physical properties such as tear resistance, dimensional stability, elasticity, load bearing capacity and so on and a process for their preparation.

Still another object of this invention is to provide urethane containing foam resins which are inherently flameproof and which have a uniform fine cell structure and good aging properties and a process for preparing them.

Yet another object of this invention is to provide a method for preparing inherently flameproof polyurethane foam resins from polyfunctional reactants that are compatible with one another, including polyisocyanates that are liquid at room temperature and have a viscosity that can be readily adjusted.

The foregoing objects and others which will become apparent from the following description are accomplished in accordance with this invention, generally speaking, by providing flameproof urethane containing foam resins and a process for preparing them by reacting a polyether polyol having a molecular weight of from about 750 to about 10,000, at least about 10 percent of the hydroxyl groups being primary hydroxyl groups, with organic polyisocyanates which are solutions of organic polyisocyanates containing at least two NCO groups and at least one N,N'-disubstituted allophanic acid ester group dissolved in liquid polyisocyanates or polyisocyanate mixtures, which polyisocyanates or polyisocyanate mixtures are free of allophanic acid ester groups. Water or any other suitable blowing agent may be used as well as any desired catalysts and/or other auxiliary agents but the reaction is carried out in the absence of a foam stabilizer.

Surprisingly, flameproof elastic or semi-elastic foams based on isocyanates, which foams are self-extinguishing according to ASTM D1692/67T, and which have the desired physical properties, can be produced easily from polyether polyols having a molecular weight of 750 to 10,000, at least 10 percent of the OH groups of which are primary hydroxyl groups, and polyisocyanates which are solutions of polyisocyanates containing at least two NCO groups and at least one N,N'-disubstituted allophanic acid ester group in a liquid polyisocyanate or polyisocyanate mixture which is free of allophanic acid ester groups.

In addition to the foregoing advantages, the use of polyisocyanates which contain allopanate groups in accordance with this invention provide other significant technical advantages which include the following:

(1) The polyisocyanates of this invention are liquid at room temperature and have viscosities which can be adjusted as desired. These polyisocyanates, which are more viscous than the polyisocyanates which are conventionally used, e.g. the tolylene diisocyanates, can be mixed homogeneously and very thoroughly and rapidly with the polyethers of this invention as well as the other components of the formulation. More stable foams are thus obtained in shorter reaction times and these foams have no tendency to collapse in the process of formation. The foams of this invention also have a fine, regular cell structure.
(2) The foams of this invention have better elasticity, as reflected in the improved spring characteristics in the force/deformation diagram.
(3) The foams of this invention have a higher bond strength to textiles and non-textile substrates in the production of flameproof backing.
(4) Due to shorter reaction times, it is possible to produce highly elastic moldings having a load quotient (ratio of hardness number 65 percent:hardness number 25 percent) on the order of about 3 or more at room temperature.

The polyisocyanate starting materials of this invention are solutions of polyisocyanates which contain at least two NCO groups and at least one N,N'-disubstituted allophanic acid ester group (hereinafter termed "allophanate polyisocyanates") in liquid polyisocyanates or polyisocyanate mixtures which are free from allophanic acid ester groups. Any liquid polyisocyanates or polyisocyanate mixtures which are free from allophanic acid ester groups can be used as the solvent isocyanate including, for example, aliphatic, cycloaliphatic, araliphatic or aromatic divalent and/or higher valent isocyanates such as hexamethylene-1,6-diisocyanate, cyclohexane-1,3- or -1,4-diisocyanates, 1-methylcyclohexane-2,4- or -2,6-diisocyanates, $m$- or $p$-xylylene diisocyanates, phenylene-1,3- or -1,4-diisocyanates, tolylene-2,4- or -2,6-diisocyanates and mixtures of these isomers including the undistilled crude isomer mixtures, diphenylmethane-4,4'-diisocyanate or the undistilled crude product, naphthalene-1,5-diisocyanate, triphenylmethane-4,4',4''-triisocyanate, isophorone diisocyanate, polyphenyl-polymethylene-polyisocyanates prepared by the condensation of aniline and/or alkyl-substituted anilines with formaldehyde followed by phosgenation, isocyanates which contain carbodiimide-isocyanate addition products such as, for example, those prepared as described in U.S. Pat. 3,152,162; biuret polyisocyanates such as, for example, those prepared as described in U.S. Pats. 3,201,372, 3,124,605, 3,392,183 and 3,367,956, from monomeric polyisocyanates and water, primary amines or substituted ureas or, as examples of polyisocyanates obtained by reaction with ammonia, the carbamyl biuret polyisocyanates obtained as described in U.S. Pat. 3,284,479, polyisocyanates having one or more isocyanurate rings which can be prepared from monomeric isocyanates, preferably monomeric diisocyanates by any suitable process including, for example, those described in U.S. Pat. 2,954,365, German Pats. 951,168, 1,112,285, 1,022,789 and 1,203,792. Dimeric polyisocyanates such as 3,3'-diisocyanato-4,4'-dimethyldiphenyl uretdione can also be used as can any of those mentioned in U.S. Pats. 3,350,362; 3,201,372 and mixtures thereof and the like.

Urethane-containing isocyanates prepared from the above mentioned polyisocyanates and monovalent and/or higher valent compounds containing aliphatic or aromatic hydroxyl groups at an NCO/OH ratio greater than 1 are also suitable, particularly in combination with liquid monomeric polyisocyanates. Some suitable monovalent and/or higher valent hydroxyl-containing compounds which may thus be employed include, for example, monofunctional aliphatic, cycloaliphatic, araliphatic or aromatic alcohols such as methanol, butanol, dodecyl alcohol, cyclohexanol, benzyl alcohol, phenol, cresol, any of those listed elsewhere herein and the like and mixtures thereof. Further any of the di or higher valent hydroxyl polyols listed in U.S. Pat. 3,201,372 and mixtures thereof may also be employed.

Monofunctional isocyanates such as propyl isocyanate, cyclohexyl isocyanate, phenyl isocyanate, tolyl isocyanates, $p$-chlorophenylisocyanate and the like and mixtures thereof may also be included but they should not amount to more than about 20 percent by weight based on the weight of the isocyanate combination used in accordance with this invention.

The liquid polyisocyanate solvents free from allophanate polyisocyanate are preferably isomeric mixtures of tolylene-2,4- and -2,6-diisocyanate, if desired, mixed with 4,4'-diphenylmethane diisocyanate or with the undistilled crude product of the latter. Any other suitable polyisocyanate, including any of those listed in U.S. Pat. 3,350,362 or mixtures thereof may also be used.

In the process of this invention, allophanate polyisocyanates are dissolved in liquid polyisocyanates or polyisocyanate mixtures and used with polyether polyols in which at least 10 percent of the OH groups present are primary hydroxyl groups for the production of self-extinguishing elastic or semi-elastic foams. The allophanate polyisocyanates are obtained by reacting N-substituted carbamic acid esters, which may themselves already contain NCO groups, with mono- and/or polyfunctional isocyanates. An allophanate polyisocyanate in the sense of the present process, which has two NCO groups and one allophanate group, for example, is obtained from an N-substituted carbamic acid ester and a trifunctional isocyanate or from a carbamic acid ester isocyanate and a difunctional isocyanate. An allophanate polyisocyanate which has two NCO groups and two allophanate groups is obtained from a bis-carbamic acid ester and 2 mols of diisocyanate; an allophanate polyisocyanate having 3 or 4 NCO groups is obtained from a bis-carbamic acid ester diisocyanate and one or two mols of diisocyanate. Higher functional allophanate polyisocyanates can be prepared from compounds which have a plurality of N-substituted carbamic acid ester groups with diisocyanates. N-substituted carbamic acid esters can easily be obtained, for example, by reacting glycols or polyols with diisocyanates at an NCO/OH ratio of less than 1. The NCO functionality of the end product is equal to the number of N-substituted carbamic acid ester groups present or still to be formed in the course of the reaction if every carbamic acid ester group is reacted with 1 mol of diisocyanate.

The N-substituted carbamic acid esters from which the allophanate polyisocyanates of this invention are prepared, which carbamic acid esters may themselves already contain free NCO groups, can easily be obtained from mono and/or polyisocyanates such as, for example, those already referred to herein, and mono- and/or poly-functional aliphatic, cycloaliphatic, araliphatic or aromatic hydroxyl-containing compounds. Examples of some such suitable materials include ethyl alcohol, butyl alcohol, isobutyl alcohol, oleyl alcohol, ethylene chlorohydrin, 2,2,2,-trichloroethanol, 1,3 - dichloropropanol - 2,2-bromoethanol, unsaturated alcohols such as allyl alcohol, crotyl alcohol and the halogenation products thereof such as 2,3-dibromopropanol-1 or 2,3-dibromobutanol-1; glycols such as 1,2-propylene glycol, 1,3-butylene glycol, those glycols of the general formula $HO—(CH_2)_n—OH$ in which n is an integer of 2 to 10, 2,3-dibromobutene-1,4-diol, 2,2-dimethylpropane-1,3-diol, diethylene glycol, cyclohexane-1,4-diol, 4,4'-dihydroxy-diphenyl - dimethylmethane, 4,4'-dihydroxy-diphenylcarbonate, 4,4'-dihydroxy - octachloro-diphenyldimethylmethane, trimethylol propane, glycerol, pentaerythritol, monoallyl ethers of trihydric and higher hydric alcohols and their saturated halogenation products, sorbitol, sucrose and other polyhydric alcohols. Linear or branched OH-containing ether alcohols or polyethers of molecular weights up to 10,000 which are obtained by reacting the above mentioned compounds with alkylene oxides such as ethylene oxide, propylene oxide, 1,2-butylene oxide, 2,3-butylene oxide, isobutylene oxide, epichlorohydrin, styrene oxide or mixtures of such epoxides, or linear or branched polyesters with hydroxyl end groups prepared by esterification, e.g. with polycarboxylic acids or hydroxycarboxylic acids, are also suitable. Hydroxyl-containing polyacetals, polythioethers and polycarbonates are also suitable for the production of N-substituted carbamic acid esters. Any of the hydroxyl containing reactants listed in U.S. Pats. 3,201,372 and 3,028,365, for example, and mixtures thereof may also be used.

The reaction of the above mentioned hydroxyl compounds may be carried out with any suitable mono- and/or poly-isocyanates such as, for example, any of those referred to herein at an NCO/OH ratio of less than, equal to, or greater than 1. If it is intended to prepare carbamic acid esters which already contain NCO groups, the NCO/OH ratio used will always be greater than 1, so that it becomes necessary to include polyisocyanates which have a functionality of at least 2.

The reaction of the components to yield the N-substituted carbamic acid esters may be carried out with or without solvents, at room temperature or at moderately elevated temperatures and is generally exothermic.

The allophanate polyisocyanates of this invention are prepared from the above described carbamic acid esters by reacting them with di- and/or polyisocyanates to yield an allophanate polyisocyanate that must have at least two NCO groups and at least one allophanate group. This requirement can be easily fulfilled by making a suitable choice of the proportions and functionality of the reactants. In accordance with the invention, the preferred allophanate polyisocyanates which have an NCO functionality of between 3 and 6 can be obtained e.g. from bis-carbamic acid diisocyanates or tris-carbamic acid triisocyanates by subsequent reaction with 1 or 3 mols of a diisocyanate. If the same diisocyanates are used in both stages, e.g. tolylene diisocyanate, the allophanate polyisocyanates obtained have three or six aromatic NCO groups; if an aliphatic diisocyanate, e.g. hexamethylene diisocyanate, is used in the first stage and an aromatic diisocyanate in the second stage, the NCO groups of the resulting allophanate polyisocyanate are steeply graded in their reactivity, with the result that the high molecular weight polyurethane-polyurea structure can thus be influenced during the foaming process if control of foam formation by catalysts and/or other additives is not sufficient on its own.

Preparation of the allophanate polyisocyanates usually requires reaction times measured in hours and reaction temperatures of between about 100° C. and about 160° C. As would be expected, the reaction conditions depend upon the constitution of the N-substituted carbamic acid esters and the reactivity of the polyisocyanates used for the formation of the allophanate polyisocyanates. Diisocyanates such as tolylene-2,4-diisocyanate or mixtures thereof with tolylene-2,6-diisocyanate are preferred. The formation of the allophanate polyisocyanates can easily be followed and controlled by quantitative determination of the NCO content. The end products, moreover, are distinguished by characteristic absorption bands in the infrared spectrum at 1725 cm.$^{-1}$, at 1685 to 1690 cm.$^{-1}$ and at 1540 cm.$^{-1}$.

The polyisocyanate solutions of this invention may be prepared by dissolving the allophanate polyisocyanates, which have been prepared by a separate process, in liquid isocyanates which are free from allophanate polyisocyanates. It is advantageous to use solutions which are prepared in one stage by reacting hydroxy-containing compounds with excess polyisocyanate to form the allophanate polyisocyanate being adjustable to any desired concentration by the quantity of polyol used. The polyisocyanate solutions of this invention have an allophanate polyisocyanate content of 10 to 70 percent by weight, preferably 20 to 50 percent by weight.

The starting materials to be used in the practice of the invention also include polyether polyols which have a molecular weight of from about 750 to about 10,000 and contain at least two hydroxyl groups, at least 10 percent of which are present as primary OH groups. The determination of the primary OH group content is carried out by the method of Gordon Hanna and Sidney Siggia, *Journal Polymer Sci.*, Vol. 56, pages 297–304 (1962). The molecular weight of the polyether is calculated in known manner from the hydroxyl number and functionality of the polyether.

Polyethers of this type are prepared by reacting compounds which have reactive hydrogen atoms, e.g. polyalcohols, with alkylene oxides such as ethylene oxide, propylene oxide, butylene oxide, styrene oxide, epichlorohydrin and the like and mixtures thereof, followed by modification of the resulting polyethers with ethylene oxide, if desired.

Some suitable polyalcohols and phenols which may be used include e.g. ethylene glycol, diethylene glycol, polyethylene glycol, propane-1,2-diol, propane-1,3-diol, butene-1,4-diol, hexane-1,6-diol, decane-1,10-diol, butene-2-diol-(1,4), glycerol, butane-2,4-diol, hexane-1,3,6-triol, trimethylol propane, resorcinol, hydroquinone, 4,6-di-tertiary butyl pyrocatechol, 3-hydroxy-2-naphthol, 6,7-dihydroxy-1-naphthol, 2,5-dihydroxy-1-naphthol, 2,2-bis-(p-hydroxyphenyl) - propane, bis - (p - hydroxyphenyl)-methane and $a,a,w$-tris-,hydroxyphenyl)-alkanes such as 1,1,2-tris-(hydroxyphenyl)-ethane, 1,1,3-tris-(hydroxyphenyl)-propane and the like and mixtures thereof.

Other suitable polyethers include 1,2-alkylene oxide derivatives of mono- or polyamines of an aliphatic or aromatic type, e.g. ammonia, methylamine, ethylene diamine, N,N'-dimethylethylene diamine, tetra- or hexa-methylene diamine, diethylene triamine, ethanolamine, diethanolamine, oleyldiethanolamine, methyldiethanolamine, triethanolamine, aminoethyl piperazine, toluidine, *o*-, *m*- and *p*-phenylene diamines, 2,4- and 2,6-diaminotoluene, 2,6-diaminoparazylene, and multinuclear and condensed aromatic polyamines such as 1,4-naphthylene diamine, 1,5-naphthylene diamine, benzidine, 2,2'-dichloro-4,4'-diphenyldiamine, 1-fluoreneamine, 1,4-anthradiamine, 9,10-diaminophenanthrene 4,4' - diaminoazobenzene, resinous materials of the phenol and resol type and the like and mixtures thereof.

All of these polyethers are preferably prepared using ethylene oxide. The polyethers used in the instant process are modified in such a way that at least 10 percent primary OH groups are in terminal position. The above mentioned polyethers may also be modified by reacting them with less than equivalent quantities of polyisocyanates.

The higher molecular weight polyethers of this invention may also be used in admixture with lower molecular weight compounds which have molecular weights of up to about 750 and at least two active hydrogen atoms reactive with NCO groups or in admixture with other higher molecular weight compounds which have molecular weights of greater than about 750 and at least two active hydrogen atoms reactive with NCO groups. Some suitable low molecular weight compounds having at least two active hydrogen atoms are especially hydroxyl-containing and/or amino-containing compounds such as ethylene glycol, 1,3-butylene glycol, 1,4-butylene glycol, glycerol, trimethylol propane, castor oil, tris-(hydroxy-alkyl)-phosphites, 4,4'-diaminodiphenylmethane or 2,4- and 2,6-diaminotoluene or addition products (molecular weights as a rule 200 to 750) of alkylene oxides such as ethylene oxide, propylene oxide or butylene oxide with such low molecular weight compounds which have active hydrogen atoms or with water. Other higher molecular weight compounds with active hydrogen atoms include the known compounds such as polyesters, polyacetals, polythioethers, polyester amides, polycarbonates, polyols which contain urethane groups, or polyethers which are different from the polyethers used according to the invention. Any of the higher or lower molecular weight compounds listed in U.S. Pat. 3,201,372 may be employed as well as mixtures.

The production of the self-extinguishing polyurethane foams of this invention may be carried out by the known one-shot process or by the prepolymer process as described, for example, in U.S. Pat. 3,201,372 and U.S. Reissue Pat. 24,514. In the latter case, the polyols are first reacted with the polyisocyanate solutions of the invention without water and a foam may be produced by adding additional polyisocyanate, catalyst, water and/or blowing agents and auxiliary agents. In the one-shot process, production of the foam is carried out at room temperature or elevated temperature by simply mixing the polyisocyanates of the invention with the polyols of this invention using water and/or other blowing agents and, if desired, emulsifiers and other auxiliary agents. Mechanical devices such as, for example, those described in U.S. Reissue Pat. 24,514 are advantageously used for this purpose.

Any suitable emulsifiers may be used in the practice of this invention including, e.g., addition products of ethylene oxide or ethylene oxide/propylene oxide with hydrophobic substances which contain hydroxyl, hydroxyalkylene, amino or amido groups, or any of those mentioned in the patents cited herein.

Any suitable catalysts may be used for the production of flame resistant foams which contain urethane groups including tertiary amines and/or silaamines, N-substituted aziridines or hexahydrotriazines. These compounds may also be used in combination with organic metal compounds. These catalysts contribute in varying extents to the acceleration of the individual partial reactions which take place during foam formation. Whereas the foaming reaction is preferentially catalyzed by amines, organic metal compounds act preferentially on the crosslinking reaction. Depending upon the constitution of the amine or silaamine used, the degree of catalytic influence on the foaming reaction, e.g. the reaction between isocyanate groups and water with elimination of carbon dioxide, may vary. In order to obtain reaction times which are advantageous from the point of view of the foaming technique, the quantity of the amine to be used is determined empirically according to the constitution of the chosen catalyst or catalyst mixture. The amines used may be those well known for the production of polyurethane foams, such as, for example, dimethylbenzylamine, N-methyl morpholine, triethylene diamine, dimethyl piperazine, 1,2-dimethyl imidazole, dimethylaminoethanol, diethanolamine, triethanolamine, diethyl aminoethanol, N, N,N',N'-tetramethyl-1,3-butane diamine, N-methyl-N'-dimethylaminoethyl piperazine, pentamethylene triamine and the like and mixtures thereof.

Any suitable silaamines may be used including silicon compounds which contain carbon-silicon bonds, e.g. those described in German Pat. 1,229,290, including 2,2,4-trimethyl - 2 - silamorpholine, 1,3-diethylaminomethyl-tetramethyldisoloxane and the like and mixtures thereof. Nitrogen containing bases such as tetraalkyl ammonium hydroxides and alkalies, alkali metal phenoxides or alcoholates, for example sodium methoxide, may also be used. The organo-metallic compounds which may be used in combination with the amines, silaamines and hexahydrotriazines are preferably organic tin compounds, e.g. stannous octoate or dibutyl tin dilaurate. Any of the catalysts listed in any of the patents cited herein may also be used.

Additives for regulating the pore size and cell structure may also be used as may organic or inorganic fillers and dyes or plasticizers, such as stannic acid esters or any such materials described in the patents cited hereinbefore.

The foams of this invention are classified as flameproof and as self-extinguishing according to ASTM test D 1692–67T, without the addition of flame-retarding additives. A further improvement in flame resistance can be achieved by the addition of known flame protective agents such as trichloro- or tribromo-alkyl phosphates, although this improvement is partly lost again under extreme storage conditions, e.g. at high temperatures over prolonged periods.

The flame resistance of the products of this invention which is high in any case, can be permanently and substantially improved by modifying the allophanate polyisocyanate solutions of this invention with chlorine-containing and/or bromine-containing compounds which can be incorporated into the structure, i.e. which contain hydrogen atoms reactive with isocyanate groups. The effect achieved is not influenced by the position at which these flame protective agents are incorporated into the structure, for example, whether they are incorporated directly into the allophanate polyisocyanate, e.g. when chlorinated and/or brominated polyols such as 2,3-dibromobutene-1,4-diol, are used or whether they are added subsequently to the allophanate polyisocyanate solutions. In the latter case, the reactive flame protective agents may be linked at least partially with the polyisocyanates or polyisocyanate mixtures which are used as solvents.

Any suitable flame protective agents which can be incorporated into the foam structure may be used including 2-chloroethanol-1, 2-bromoethanol-1, trichloroethanol, 1,3- and 2,3-dichloropropanol-1, 1-bromopropanol-2, 2,3-dibromopropanol-1, 2-bromopropane-1, 3-diol, 3,4-dichlorobutanol-1, 2,3-dibromobutanol-1, 1,4-dibromobutanol-2, 3,3,4,4-tetrachloro-2-methylbutanol-2, 1-bromo-2-methylpropanol-2, 2,3-dichlorobutane-1,4-diol, 2,3-dibromobutane-1,4-diol, 2,3-dibromobutene-1,4-diol, 2,2-bis-(bromomethyl)-propane-1,3 - diol, 2 - bromo-2,2-bis-(bromomethyl)-propanol, 2-bromocyclohexanol-1, styrene chlorohydrin and styrene bromohydrin, 4,4'-dihydroxy-octachloro-diphenyldimethylmethane, bromoacetic acid and the like and mixtures thereof.

The elastic and semi-elastic foams which can be produced by the process of this invention are used, for example, as cushioning material, mattresses, packaging material, foils for laminates, insulating materials and, due to their flame resistance, in any application in which a high degree of flame resistance is particularly valuable, e.g. in the construction of motor cars and aircraft. Parts may be produced from the formulations of this invention either by foaming in a mold or by manufacturing them from material which has been foamed in blocks.

The invention is further illustrated but is not intended to be limited by the following examples in which all parts and percentages are by weight unless otherwise specified.

EXAMPLE 1

A. Preparation of the isocyanate solution

About 104 parts of 2,2-dimethylpropane-1,3-diol are added in portions in the course of about one hour with constant stirring to about 1496 parts of tolylene-2,4- and -2,6-diisocyanates (isomeric ratio 80:20) which have been introduced into a reaction vessel and heated to about 80° C. The reaction mixture heats up to about 120° C. during the course of the addition. After a total heating time of about 1½ hours, the NCO content is found to be about 40 percent, which corresponds to the 39.9 percent NCO calculated for biscarbamic acid ester diisocyanate. The reaction mixture is then heated to about 150° C. and kept at this temperature for about 13 hours. A solution, containing about 41 percent of solid substance, of an allophanate-polyisocyanate in an isomeric mixture of tolylene-2,4- and -2,6-diisocyanate which has an NCO content of 36.4 percent, a viscosity of 79 cp. 25° and a refractive index $n_D^{20}$ of 1.5800 is obtained which has all the absorption bands in the infra-red spectrum characteristic of an allophanate polyisocyanate.

B. Process of the invention

About 100 parts of a linear polypropylene oxide ethylene oxide polyether based on propylene glycol and having 65 per cent of terminal primary OH groups and an hydroxyl number of 28 are reacted with about 2 parts of 1,4-butylene glycol, about 2.5 parts of water, about 0.3 part of triethylene diamine and about 46 parts of the isocyanate solution described under 1A. to produce a soft, highly elastic polyurethane foam which is self-extinguishing according to the method of ASTM–D 1692–67T and which has a burning length of 25 mm. with an average extinguishing time of 12 seconds.

EXAMPLE 2

A. Preparation of the isocyanate solution

About 106 parts of diethylene glycol are added with constant stirring in the course of about one hour to about 1392 parts of tolylene-2,4- and -2,6-diisocyanates (isomeric ratio 80:20) which have been introduced into a reaction vessel. The reaction temperature is maintained at between about 70° and about 80° C. When the isocyanate content of the biscarbamic acid ester diisocyanate formed as intermediate product in the isomeric tolylene diisocyanate mixture is reached (NCO content=39.3 percent), the reaction mixture is heated to about 140° C. and maintained at this temperature for about 10 hours. At the end of this time, a solution containing about 47 percent of solid substance of an allophanate-polyisocyanate in an isomeric mixture of tolylene diisocyanate is obtained which has an NCO content of 34.4 percent, a viscosity of 280 cp. 25° and a refractive index $n_D^{20}$ of 1.5859.

B. Process according to the invention

About 100 parts of a trifunctional polyether of propylene oxide and ethylene oxide having an OH number of 35.5 and containing about 72 percent of primary OH groups are reacted with about 2.5 parts of water, about 0.3 part of triethylene diamine and about 43 parts of isocyanate solution 2A. to form a soft, highly elastic polyurethane foam which has the following mechanical properties:

Bulk density (kg./m.$^3$) _____ 40
Elongation at break (percent) _____ 130
Tensile strength (kg. wt./cm.$^2$) _____ 0.7
Compression strength (p./cm.$^2$ at 40% compression) _____ 22
Burning test according to ASTM–D 1692–67T:
 Average burning length (mm.) _____ 28
 Average extinguishing time (sec.) _____ 22

EXAMPLE 3

A. Preparation of the isocyanate solution

About 134 parts of trimethylol propane are added in the course of about one hour to about 3132 parts of tolylene-2,4- and -2,6-diisocyanates (isomeric ratio 80:20) which have been introduced into the reaction vessel and heated to about 80° C. The temperature is kept between about 80° to about 90° C. by cooling. When the NCO content of the triscarbamic acid ester triisocyanate has reached a value of 42.4 percent, which occurs after about 1½ hours, the reaction mixture is heated to about 145° C. and retained at this temperature under a protective gas atmosphere of nitrogen for about 22 hours. A solution containing about 30 percent of solid substance of an allophanate-polyisocyanate in an isomeric mixture of tolylene diisocyanates is obtained which has an NCO content of 39.7 percent, a viscosity of 33 cp. 25° C., a refractive index $n_D^{20}$ of 1.5810 and the characteristic absorption bands in the IR spectrum of an allophanate polyisocyanate.

B. Process according to the invention

About 100 parts of a trifunctional polyether of propylene oxide and ethylene oxide which is based on trimethylol propane, has an OH number of 35 and contains 70 percent of primary OH groups are reacted with about 2 parts of diethylene glycol, about 2.5 parts of water, about 0.3 part triethylene diamine and about 42 parts of isocyanate solution 3A. to form a soft polyurethane foam which has the following properties:

Bulk density (kg./m.$^3$) _____ 39
Elongation at break (percent) _____ 135
Tensile strength (kg. wt./cm.$^2$) _____ 0.7
Compression strength (p./cm.$^2$ at 40% compression) _____ 19
Compression set (percent at 90% compression) ____ 4.4
Burning test according to ASTM–D 1692–67T:
 Average burning length (mm.) _____ 32
 Average extinguishing time (sec.) _____ 20

EXAMPLE 4

A. Preparation of the isocyanate solution

About 134 parts of trimethylol propane are added in the course of about one hour to 2610 parts of tolylene-2,4- and -2,6-diisocyanates (isomeric ratio 80:20) which have been introduced into a reaction vessel and heated to about 80° C. The reaction mixture heats up to about 114° C. When an NCO content of 41.3 percent NCO has been reached immediately after the addition of trimethylol propane, the reaction mixture is heated to about 150° C. and kept at this temperature for about 20 hours. A solution of an allophanate polyisocyanate in an isomeric mixture of olylene diisocyanates having an NCO content of 38.1 percent and a viscosity of 77 cp. 25° is thus formed.

About 100 parts 2,3-dibromopropanol-1 are added to about 1900 parts of this solution at about 80° C. and the mixture is reacted for about 2½ hours at about 90° C. The modified allophanate polyisocyanate in the isomeric tolylene diisocyanate mixture has an NCO content of 35.1 percent, and viscosity of 118 cp. 25° C., a solids content of 41 percent and the absorption bands in the IR spectrum characteristic of an allophanate polyisocyanate.

B. Process of the invention

About 100 parts of a trifunctional polyether of propylene oxide and ethylene oxide based on glycerol having an OH number of 35 and containing about 72 percent of primary OH groups are reacted with about 2.5 parts of water, about 0.3 part of triethylene diamine and about 42 parts of isocyanate solution 4A. to form a soft polyurethane foam which has the following properties:

Bulk density (kg./m.$^3$) _____ 41
Elongation at break (percent) _____ 125
Tensile strength (kg. wt./cm.$^2$) _____ 0.6
Compression strength (p./cm.$^2$ at 40% compression) _____ 26
Compression set (percent at 90% compression) ____ 8.0
Burning test according to ASTM–D 1692–67T:
 Average burning length (mm.) _____ 24
 Average extinguishing time (sec.) _____ 15

C. Process of the invention

About 100 parts of a trifunctional polyether of propylene oxide and ethylene oxide based on glycerol having an OH number of 35 and containing about 72 percent of primary OH groups are reacted with about 2.5 parts of water, about 0.3 part of triethylene diamine, about 18 parts of isocyanate solution 4A. and about 18 parts of tolylene diisocyanate (80 percent 2,4- and 20 percent 2,6-isomer) to yield a soft, highly elastic polyurethane foam which has the following mechanical properties:

| | |
|---|---|
| Bulk density (kg./m.$^3$) | 38 |
| Elongation at break (percent) | 145 |
| Tensile strength (kg. wt./cm.$^2$) | 0.7 |
| Compression strength (p./cm.$^2$ at 40% compression) | 18 |
| Compression set (percent at 90% compression) | 4.7 |
| Burning test according to ASTM–D 1692–67T: | |
| Average burning length (mm.) | 38 |
| Average extinguishing time (sec.) | 16 |

EXAMPLE 5

A. Preparation of the isocyanate solution

An allophanate polyisocyanate solution in tolylene diisocyanate having an NCO content of 36.2 percent is obtained by the method described in Example 3 from about 134 parts of trimethylol propane and about 2088 parts of tolylene-2,4- and -2,6-diisocyanates (isomeric mixture 80:20) after heating for about 28 hours at from about 135° C. to about 145° C. About 122 parts of trichloroethanol are added to this solution and reacted for about 5 hours at about 80° C. to about 95° C. A solution of a modified allophanate polyisocyanate in an isomeric tolylene diisocyanate mixture having an NCO content of 32%, a viscosity of 795 cp. 25° and a solids content of 50 percent is obtained.

B. Process of the invention

About 100 parts of trifunctional polyether of propylene oxide and ethylene oxide having an OH number of 35 and containing about 72 percent of primary OH groups are reacted with about 2.5 parts of water, about 0.3 part of triethylene diamine and about 46 parts of the isocyanate solution 5A. to form a soft polyurethane foam which has good physical properties. In ASTM test D 1692–67T, the highly elastic foam has an average burning length of 28 mm. and an average extinguishing time of 11 seconds.

EXAMPLE 6

A. Preparation of the isocyanate solution

About 600 parts of a urethane resin in powder form obtained from about 13 mols of 2,2-dimethylpropane-1,3-diol and about 12 mols of tolylene-2,4-diisocyanate and having an hydroxyl number of 33 are added in the course of one hour to about 3400 parts of tolylene-2,4- and 2,6-diisocyanates (isomeric ratio 80:20) heated to about 120° C. while the reaction mixture is constantly stirred. The reaction mixture is then heated to about 150° C. for about 21 hours to yield a solution having an NCO content of 36.7 percent and a viscosity of 330 cp. 25° containing a high functionality allophanate polyisocyanate in an isomeric tolylene diisocyanate mixture.

B. Process of the invention

About 100 parts of a linear polyether of polypropylene oxide and ethylene oxide based on propylene glycol having 65 percent of terminal primary OH groups and an hydroxyl number of 28 are reacted with about 1 part of N-methyl-N'-dimethylaminoethyl piperazine, about 2 parts of ethylene glycol, about 2.5 parts of water and about 44 parts of isocyanate solution 6A. to form a soft, highly elastic polyurethane foam which has good physical properties. The foam is self-extinguishing according to ASTM test D 1692–67T and has an average burning length of 33 mm. and an average extinguishing time of 17 seconds.

EXAMPLE 7

A. Preparation of the isocyanate solution

About 342 parts of 4,4'-dihydroxy-diphenyldimethylmethane are added to about 3915 parts of tolylene-2,4- and -2,6-diisocyanates (isomeric ratio 80:20) which have been introduced into the reaction vessel and heated to about 100° C. When an NCO content of 41.4 percent has been reached for the biscarbamic acid ester triisocyanate, the reaction mixture is heated to about 150° C. and kept at this temperature for about 25 hours. A solution of an allophanate polyisocyanate in an isomeric tolylene diisocyanate mixture is obtained which has an NCO content of 39.4 percent and a viscosity of 30 cp. 25°.

B. Process of the invention

About 100 parts of a branched polyether of trimethylol propane, hexanetriol, butylene oxide and ethylene oxide hydroxyl number 33.6, 66 percent of primary OH groups) are reacted with about 0.75 part of N-methyl-N'-dimethylaminoethyl piperazine, about 2.5 parts of water, about 2 parts of tris-($b$-chloroethyl)-phosphate and about 37 parts of isocyanate solution 7A. to form a polyurethane foam. The soft, highly elastic foam obtained has good physical properties and is self-extinguishing according to ASTM D–1692–67T; its average burning length is 35 mm., its average extinguishing time is 18 seconds.

EXAMPLE 8

A. Preparation of the isocyanate solution

About 192 parts of tripropylene glycol are added in the course of about 25 minutes, with air cooling, to about 1392 parts of tolylene-2,4- and -2,6-diisocyanates (isomeric ratio 80:20) which have been heated to about 80° C. A rise in temperature to about 92° C. is observed on addition of the tripropylene glycol. After heating for about 19 hours at about 140° C. under nitrogen as protective gas, a brownish solution of an allophanate polyisocyanate in tolylene diisocyanate is obtained which has a solids content of 46.8 percent, an NCO content of 32.1 percent, a viscosity of 152 cp. 25° and a refractive index $n_D^{20}$ of 1.5729. The solution shows the characteristic bands for an allophanate polyisocyanate in the IR spectrum and possesses a dimeric tolylene-2,4-diisocyanate content of approximately 4 percent.

B. Production of a foam

About 100 parts of a slightly branched polyether of propylene oxide and ethylene oxide based on trimethylol propane and dipropylene glycol having an hydroxyl number of 42 and containing 12 percent of primary OH groups are mixed with about 2.5 parts of water, about 0.3 part of triethylene diamine, about 26 parts of an isocyanate obtained by phosgenation of crude condensation products of aniline and formaldehyde (viscosity 200 cp./25° C., NCO content 32 percent). The elastic, soft polyurethane foam which forms has good mechanical properties and an average burning length of 36 mm. and an average extinguishing time of 20 seconds according to the ASTM test D 1692–67T.

EXAMPLE 9

A. Preparation of the isocyanate solution

About 134 parts of dipropylene glycol are added in the course of about 20 minutes, with air cooling, to about 2088 parts of tolylene-2,4- and -2,6-diisocyanates (isomeric ratio 80:20) in a reaction vessel. A temperature rise from the initial temperature of about 80° C. to about 90° C. is observed. After heating for about 30 hours at about 140° C. under nitrogen as protective gas, a yellow to pale brown solution of an allophanate polyisocyanate in tolylene diisocyanate is obtained, which solution contains 33.2 percent of solid substance and has an NCO content of 37.9 percent, a viscosity of 35 cp. 25° and a refractive index $n_D^{20}$ of 1.5774. The solution shows the characteristic bands for an allophanate polyisocyanate in the IR spectrum and has a dimeric tolylene-2,4-diisocyanate content of approximately 5 to 6 percent.

B. Preparation of a foam

About 100 parts of a branched polyether of trimethylol propane, hexanetriol, butylene oxide and ethylene oxide (hydroxyl number 33.6, 66 percent primary hydroxyl groups) are mixed with about 0.3 part of triethylene diamine, about 2.5 parts of water, about 22 parts of isocyanate solution 9A. and about 23 parts of a solution of branched isocyanates which contain urethane groups (35.1 percent by weight of NCO, viscosity 150 cp./25° C.), which solution has been prepared by reacting 85 parts of tolylene diisocyanate (80 percent 2,4- and 20 percent 2,6-isomer) with about 15 parts of an addition product of propylene oxide with trimethylol propane which has an hydroxyl number of 534. After about 90 seconds, a highly elastic, soft polyurethane foam forms which has good mechanical properties, an average burning length of 27 mm. and an average extinguishing time of 20 seconds according to the ASTM test D 1692–67T.

EXAMPLE 10

A. Preparation of the isocyanate solution

About 90 parts of butane-1,3-diol are added in the course of about 15 minutes with cooling to about 1740 parts of tolylene-2,4- and -2,6-diisocyanates (isomeric ratio 80:20) which have been introduced into the reaction vessel. A temperature rise from the initial temperature of about 80° C. to about 90° C. is observed. After heating for about 26 hours at about 130° C. under nitrogen as a protective gas, a reddish brown solution of an allophanate polyisocyanate in tolylene diisocyanate is obtained which contains 41.9 percent of solids and has an NCO content of 36.8 percent, a viscosity of 88 cp. 25°, a refractive index $n_D^{20}$ of 1.5834 and which shows the bands characteristic of an allophanate polyisocyanate in the IR spectrum.

B. Production of a foam

About 100 parts of a polyether of polypropylene oxide and polyethylene oxide based on trimethylol propane and hexanetriol containing 67 percent of terminal primary OH groups and having an hydroxyl number of 35 are reacted with about 2.5 parts of water, about 0.3 part of triethylene diamine, about 2 parts of sodium castor oil sulphonate (50 percent of water) and about 53 parts of isocyanate solution 10 A. to yield a soft, highly elastic foam which has the following properties:

Bulk density (kg./m.³) _____ 33
Tensile strength (kg. wt./cm.²) _____ 0.7
Elongation at break (percent) _____ 135
Compression strength (p./cm.² at 40% compression) _____ 22
Burning test according to ASTM–D 1692–67T:
    Average burning length (mm.) _____ 25
    Average extinguishing time (sec.) _____ 12

EXAMPLE 11

A. Preparation of the isocyanate solution

About 500 parts of the modified allophanate polyisocyanate in tolyene diisocyanate prepared in Example 4A. are mixed with about 500 parts of a solution containing 30 percent of isocyanurate polyisocyanate obtained from tolylene-2,4-diisocyanate in a mixture of about 58 percent 2,4-tolylene diisocyanate and about 12 percent of 2,6-tolylene diisocyanate. The solution which contains isocyanurate polyisocyanate has an NCO content of 39.5 percent, a viscosity of 54 cp. 25° and a refractive index $n_D^{20}$ of 1.5827. The mixture of solutions which is suitable for producing foams has an NCO content of 37.5 percent, a viscosity of 76 cp. 25° and a refractive index $n_D^{20}$ of 1.5843.

B. Production of a foam

About 100 parts of a linear polyether of polypropylene oxide and ethylene oxide based on propylene glycol having 65 percent of terminal primary hydroxyl groups and an hydroxyl number of 28 are reacted with about 2.5 parts of water, about 1 part of N,N',N''-pentamethyldiethylene triamine and about 37 parts of isocyanate solution 11A. to yield a soft, highly elastic polyurethane foam which has good mechanical properties. This foam has an average burning length of 28 mm. and an average extinguishing time of 16 seconds according to ASTM test D–1692–67T.

EXAMPLE 12

A. Preparation of the isocyanate solution

About 900 parts of the modified allophanate polyisocyanate in tolylene diisocyanate prepared in Example 4A. are mixed with about 100 parts of a biuret polyisocyanate (NCO content 21.3 percent) prepared from hexamethylene diisocyanate and H₂O. The resulting solution has an NCO content of 33.9 percent, a viscosity of 214 cp. 25° and a refractive index $n_D^{20}$ of 1.5764.

B. Production of a foam

About 100 parts of a trifunctional polyether of phloroglucine, propylene oxide and ethylene oxide having an hydroxyl number of 46 and containing 68 percent of terminal primary hydroxyl groups are reacted with about 2.5 parts of water, about 0.3 part of endoethylene piperazine and about 45 parts of isocyanate solution 12A. to produce a soft, highly elastic polyurethane foam. This foam has good mechanical properties and an average burning length of 24 mm. and an average extinguishing time of 20 seconds according to ASTM D–1692–67T.

EXAMPLE 13

A. Preparation of the isocyanate solution

About 900 parts of the modified allophanate polyisocyanate in tolylene diisocyanate prepared in Example 4A. are mixed with about 100 parts of 4,4'-diphenylmethane diisocyanate. After removal of a small amount of insoluble constituents, a slightly cloudy solution is obtained which has an NCO content of 35.1 percent, a viscosity of 81 cp. 25° and a refractive index $n_D^{20}$ of 1.5872.

B. Production of a foam

About 100 parts of a trifunctional polyether of propylene oxide and ethylene oxide having an hydroxyl number of 35.5 and containing 72 percent of primary hydroxyl groups are reacted with about 2.5 parts of water, about 0.3 part of triethylene diamine and about 42 parts of isocyanate solution 13A. to yield a soft, highly elastic polyurethane foam which has the following mechanical properties:

Bulk density (kg./m.³) _____ 40
Elongation at break (percent) _____ 135
Tensile strength (kg. wt./cm.²) _____ 0.7
Compression strength (p./cm.² at 40% compression) _____ 27
Burning test according to ASTM–D 1692–67T:
    Average burning length (mm.) _____ 27
    Average extinguishing time (sec.) _____ 16

EXAMPLE 14

A. Preparation of the isocyanate solution

About 465 parts of a mixture having an NCO content of 17.9 percent which is prepared from about 386 parts of an addition product of 1 mol of pentaglycol and 2 mols of hexamethylene diisocyanate (percent NCO:19.1) and about 79 parts of an addition product of 2 mols of pentaglycol and 3 mols of hexamethylene diisocyanate (percent NCO:11.8) are heated to about 135° C. for about seven hours with about 696 parts of tolylene-2,4- and -2,6-diisocyanates (isomeric ratio 80:20) and thereafter for another 20 hours at about 150° C., using nitrogen as protective gas. A solution of an allophanate polyisocyanate in tolylene diisocyanate is obtained which contains aliphatic and aromatic NCO groups. This solution contains 68.9 percent of solid substance, has an NCO content of 26.5 percent, a viscosity of 4900 cp. 25°, a refractive index $n_D^{20}$ of 1.5598 and the characteristic bands for an allophanate polyisocyanate in the IR spectrum. A polyisocyanate mixture suitable for the production of foams is obtained from about 600 parts of the above described allophanate polyisocyanate solution and about 435 parts of tolylene-2,4- and -2,6-diisocyanate (isomeric mixture 80:20). This mixture has an NCO content of 35.5 percent, a viscosity of 99 cp. 25° and a refractive index $n_D^{20}$ of 1.5639.

B. Production of a foam

About 100 parts of a trifunctional polyether of propylene oxide and ethylene oxide which has an hydroxyl number of 35 and contains 72 percent of primary hydroxyl groups, about 2.5 parts of water, about 0.2 part of triethylene diamine, about 0.5 part of triethylamine and about 41 parts of isocyanate solution 14A. are fed separately into the mixing chamber of a foaming machine into which air is injected under a pressure of approximately one excess atmosphere. Foam formation begins after a cream time of about nine seconds and terminates after about 135 seconds. The polyurethane foam obtained has the following properties:

| | |
|---|---|
| Bulk density (kg./m.$^3$) | 41 |
| Tensile strength (kg. wt./cm.$^2$) | 0.8 |
| Elongation at break (percent) | 123 |
| Compression strength (p./cm.$^2$ at 40% compression) | 32 |
| Burning test according to ASTM–D 1692–67T: | |
| Average burning length (mm.) | 54 |
| Average extinguishing time (sec.) | 42 |

EXAMPLE 15

A. Preparation of the isocyanate solution

About 960 parts of a solution of an allophanate polyisocyanate in tolylene diisocyanate prepared as described in Example 4A., first paragraph, from trimethylol propane and tolylene diisocyanate (NCO content of the solution 37.9 percent, viscosity 96 cp. 25°) are reacted during the course of about 1.5 hours at about 80° C. with about 40 parts of 2,3-dibromobutene-1,4-diol to yield a modified allophanate polyisocyanate solution having an NCO content of 34.3 percent, a viscosity of 358 cp. 25° and a refractive index $n_D^{20}$ of 1.5892.

B. Production of a foam

About 100 parts of a slightly branched polyether of propylene oxide and ethylene oxide based on trimethylol propane and dipropylene glycol having an hydroxyl number of 42 and containing 12 percent of primary hydroxyl groups are reacted with about 3 parts of water, about 0.1 part of triethylene diamine, about 1 part of dimethylbenzylamine and about 52 parts of isocyanate solution 15A. to yield a soft, highly elastic polyurethane foam. This foam has good mechanical properties and an average burning length of 26 mm. and an average extinguishing time of 22 seconds according to ASTM D–1692–67T.

EXAMPLE 16

A. Preparation of the isocyanate solution

About 104 parts of pentaglycol are added at about 80° C. to about 1344 parts of hexamethylene diisocyanate which have been introduced into a reaction vessel. The mixture is then reacted for about 33 hours at about 150° C. to yield a solution of an allophanate polyisocyanate in hexamethylene diisocyanate having an NCO content of 33.0 percent. The excess hexamethylene diisocyanate is removed by distillation at 0.1 mm. Hg and 112° C. to yield an allophanate polyisocyanate having an NCO content of 18.1 percent and the bands characteristic of an allophanate isocyanate in the IR spectrum. About 400 parts of this allophanate polyisocyanate are dissolved in about 600 parts of tolylene-2,4- and -2,6-diisocyanate (isomeric mixture 80:20). A solution suitable for the production of foams is obtained which has an NCO content of 55 cp. 25° and a refractive index $n_D^{20}$ of 1.5402.

B. Production of a foam

About 100 parts of a trifunctional polyether of propylene oxide and ethylene oxide which has an hydroxyl number of 35 and contains 72 percent of primary hydroxyl groups are mixed with about 2.5 parts of water, about 0.5 part of N,N′,N″-pentamethyl-diethylene triamine and about 41 parts of isocyanate solution 16A. Foam formation begins after a cream time of about 12 seconds and is completed after about 95 seconds. The foam is soft and highly elastic, has good mechanical properties and an average burning length of 75 mm. and an average extinguishing time of 50 seconds according to the ASTM test D 1692–67T.

EXAMPLE 17

A. Preparation of the isocyanate solution

About 600 parts of a polyether prepared from trimethylol propane, propylene oxide and ethylene oxide which has an OH number of 35 and contains 72 percent of primary hydroxyl groups are introduced at about 80° C. into a reaction vessel containing about 400 parts of the modified allophanate polyisocyanate of Example 4A, in tolylene diisocyanate. After a heating time of about one hour at about 80° C. to about 90° C., a prepolymer is obtained which has an NCO content of 12.5 percent and a viscosity of 4050 cp. 25°.

B. Production of a foam

About 100 parts of prepolymer 17A are intimately mixed with about 3 parts of water and about 0.3 part of triethylene diamine. The reaction mass starts to become cloudy after a few seconds and a foam is produced, the formation of which is completed after about 90 seconds. The resulting soft, highly elastic polyurethane foam has good mechanical properties, an average burning length of 40 mm. and an average extinguishing time of 32 seconds according to ASTM test D 1692–67T.

EXAMPLE 18

About 100 parts of a polypropylene glycol which has been started on trimethylol propane and which has been modified with ethylene oxide to yield 65 percent of terminal primary hydroxyl groups and an hydroxyl number of 35 are intimately mixed with about 2.5 parts of water, about 0.2 part of endoethylene piperazine and about 1.5 parts of dimethylbenzylamine. The mixture is reacted with about 42 parts of isocyanate solution 4A. The liquid reaction mixture is introduced into an open mold which is then closed with a cover and left to stand at room temperature for about ten minutes. At the end of this time, a molded product is removed which has excellent dimensional resilience and the following mechanical properties:

| | |
|---|---|
| Bulk density (kg./m.$^3$) | 80 |
| Tensile strength (kg. wt./cm.$^2$) | 1.0 |
| Elongation at break (percent) | 120 |
| Compression strength (p./cm.$^2$ at 40% compression) | 40 |
| Burning test according to ASTM–D 1692–67T: | |
| Average burning length (mm.) | 22 |
| Average extinguishing time (sec.) | 22 |

Therefore, the foam is self-extinguishing.

EXAMPLE 19

About 100 parts of a polypropylene glycol which has been started on a mixture of pentaerythritol and 4,4′-dihydroxydiphenyldimethylmethane and modified with ethylene oxide to yield 72 percent of primary hydroxyl end groups and an hydroxyl number of 36 are vigorously mixed with about 3 parts of water, about 0.3 part of endoethylene piperazine and about 48 parts of isocyanate solution 4A, and reacted to yield a soft, highly elastic polyurethane foam. This foam has good mechanical properties and is self-extinguishing, having an average burning length of 23 mm. and an average extinction time of 18 seconds according to the ASTM test D 1692–67T.

EXAMPLE 20

About 100 parts of a polypropylene glycol which has been started on a mixture of sorbitol and water and modified with ethylene oxide to yield 68 percent of primary hydroxyl end groups with an hydroxyl number of 33.3 are intimately mixed with about 3 parts of water, about 0.3 part of triethylene diamine and about 47 parts of isocyanate solution 4A. After a rise time of about 40 seconds, a soft, highly elastic polyurethane foam forms which has good physical properties and which is self-extinguishing having an average burning length of 22 mm. and an average extinguishing time of 22 seconds according to the ASTM test D 1692–67T.

EXAMPLE 21

A polyether which has an hydroxyl number of 134 is obtained by mixing about 80 parts of a polyether of polypropylene oxide and polyethylene oxide obtained from trimethylol propane and hexanetriol and having 67 percent of terminal primary hydroxyl groups and an hydroxyl number of 35 with about 20 parts of a reaction product of aniline and propylene oxide having an hydroxyl number of 530. About 100 parts of this polyether mixture are mixed with about 2.5 parts of water, about 0.3 part of triethylene diamine and about 61.5 parts of isocyanate solution 4A, using a stirrer. A semi-hard polyurethane foam which has good physical properties is obtained after a rise time of about 100 seconds. This foam has an average burning length of 28 mm. and an average extinction time of 28 seconds according to the ASTM test D 1692–67T and is, therefore, self-extinguishing.

EXAMPLE 22

About 100 parts of a tetrafunctional polypropylene glycol which is based on pentaerythritol and modified with ethylene oxide to yield 77 percent of primary hydroxyl end groups and an hydroxyl number of about 42 are intimately mixed with about 3 parts of water, about 0.1 part of triethylene diamine, about 1 part of dimethylbenzylamine and about 49 parts of isocyanate solution 4A, using a mechanical stirrer. A soft, highly elastic polyurethane foam which has good physical properties is obtained after a rise time of about 85 seconds. According to the ASTM test D 1692–67T, this foam has an average burning length of 25 mm. and an average extinguishing time of 12 seconds. The foam is therefore self-extinguishing.

EXAMPLE 23

About 100 parts of a polypropylene glycol which has been started on trimethylol propane and modified with ethylene oxide to yield 65 percent of primary hydroxyl end groups and an hydroxyl number of 35 are mixed with about 2.5 parts of water, about 0.3 part of triethylene diamine, about 4 parts of tris-(2,3-dibromopropyl)-phosphate and about 37 parts of isocyanate solution 3A. After a rise time of about 90 seconds, a soft, highly elastic polyurethane foam forms which has good physical properties and, according to ASTM test D 1692–67T, an average burning length of 28 mm. and an average extinguishing time of 11 seconds. The foam is, therefore, self-extinguishing.

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention except as is set forth in the claims.

What is claimed is:

1. Flame-resistant polyurethane foams prepared by a process which comprises reacting in the presence of a blowing agent and in the absence of a foam stabilizer a polyether polyol having a molecular weight of from about 750 to about 10,000 in which at least 10 percent of the hydroxyl groups are primary hydroxyl groups with a polyisocyanate which is a solution of from about 10 to about 70 percent by weight of an organic polyisocyanate containing at least one N,N'-disubstituted allophanic acid ester group dissolved in a liquid polyisocyanate which is free from allophanic acid ester groups.

2. The polyurethane of Claim 1 wherein the polyisocyanate is a solution of an organic polyisocyanate obtained by reacting an organic hydroxyl containing compound with tolylene diisocyanate dissolved in tolylene diisocyanate.

3. The polyurethane of Claim 1 wherein the polyisocyanate is a solution of an organic polyisocyanate obtained by reacting an organic hydroxyl containing compound with tolylene diisocyanate dissolved in 4,4'-diphenylmethane diisocyanate.

4. The polyurethane of Claim 1 wherein the reaction mixture contains a flame protective agent.

5. The polyurethane of Claim 1 wherein the N,N'-disubstituted allophanic acid ester is prepared by reacting an organic hydroxyl containing compound with an aliphatic, cycloaliphatic, araliphatic or aromatic isocyanate or mixtures thereof.

References Cited

UNITED STATES PATENTS

| 3,336,242 | 8/1967 | Hampson et al. | 260—2.5 |
| 3,267,077 | 8/1966 | Windemuth et al. | 260—2.5 |
| 2,779,689 | 1/1957 | Reis | 260—2.5 |
| 3,361,844 | 1/1968 | Hoeschele | 260—77.5 |

FOREIGN PATENTS

| 994,890 | 6/1965 | Great Britain | 260—2.5 |
| 1,049,399 | 11/1966 | Great Britain | 260—2.5 |
| 889,720 | 2/1962 | Great Britain | 260—2.5 |

OTHER REFERENCES

"Plastics Institute Transaction," 1965, pp. 247–55.

DONALD E. CZAJA, Primary Examiner

E. C. RZUCIDLO, Assistant Examiner

U.S. Cl. X.R.

260—2.5 AJ, 2.5 AP, 77.5 AT